(12) United States Patent
Nes (10) Patent No.: US 9,374,945 B2
(45) Date of Patent: Jun. 28, 2016

(54) COMBINED METHOD FOR COMPACTING MATERIAL INTO A BALE AND WRAPPING THE BALE AND A COMBINED BALER AND BALE WRAPPING APPARATUS

(75) Inventor: Asbjørn Nes, Veitastrond (NO)

(73) Assignee: Kverneland AS, Rogaland (NO)

( * ) Notice: Subject to any disclaimer, the term of this patent is extended or adjusted under 35 U.S.C. 154(b) by 709 days.

(21) Appl. No.: 13/528,770

(22) Filed: Jun. 20, 2012

(65) Prior Publication Data

US 2012/0318152 A1    Dec. 20, 2012

(30) Foreign Application Priority Data

Jun. 20, 2011    (EP) ..................................... 11170522

(51) Int. Cl.
  *A01F 15/08*    (2006.01)
  *A01F 15/07*    (2006.01)
(52) U.S. Cl.
  CPC ......... *A01F 15/071* (2013.01); *A01F 2015/075* (2013.01); *A01F 2015/077* (2013.01)
(58) Field of Classification Search
  CPC ........... A01F 15/0715; A01F 2015/075; A01F 2015/077; A01F 15/071; A01F 2015/0755; A01F 2015/078; B65B 27/125; B65B 27/08; B65B 11/008; B65B 13/10; B65B 63/02
  USPC ........... 53/399, 587, 203, 204, 461, 582, 588; 100/3, 7, 88; 56/341
  See application file for complete search history.

(56) References Cited

U.S. PATENT DOCUMENTS

| | | | | |
|---|---|---|---|---|
| 3,837,159 A | * | 9/1974 | Vermeer .................. | A01F 15/07 100/88 |
| 4,205,513 A | * | 6/1980 | Shokoples .......... | A01F 15/0765 100/5 |
| 4,956,968 A | * | 9/1990 | Underhill ............ | A01F 15/0715 100/88 |
| 5,079,898 A | * | 1/1992 | Springs et al. .................. | 53/399 |
| 5,115,734 A | * | 5/1992 | Quartaert .......................... | 100/5 |
| 5,230,193 A | * | 7/1993 | Underhill ............ | A01F 15/0715 53/389.3 |
| 5,419,253 A | * | 5/1995 | Campbell ......................... | 100/3 |
| 5,433,059 A | * | 7/1995 | Kluver et al. ................... | 53/399 |
| 5,822,967 A | * | 10/1998 | Hood .................... | A01F 15/071 100/5 |
| 6,341,470 B1 | * | 1/2002 | Lacey ................... | A01F 15/071 53/176 |
| 6,467,237 B2 | * | 10/2002 | Viaud ................. | A01F 15/0705 100/89 |

(Continued)

FOREIGN PATENT DOCUMENTS

EP      1 077 025 B1    2/2001
EP      1285571 A1 *    2/2003

(Continued)

*Primary Examiner* — Stephen F Gerrity
*Assistant Examiner* — Joshua Kotis
(74) *Attorney, Agent, or Firm* — Dinsmore & Shohl LLP (57) ABSTRACT

An apparatus and method for compacting material into a bale and wrapping the bale with a wrapping material is set forth. The method comprises steps of supplying a material to be baled to a baling chamber of a combined baler and bale wrapping apparatus, and forming a bale of the material in the baling chamber, opening a cover of the baling chamber, securing the bale by a securing-mechanism operatively assigned to the baling chamber in the baling chamber, applying a wrapping material supplied from a dispenser to the secured bale, thereby providing one or more securing layers of the wrapping material encircling the bale, and releasing the bale from securing by the securing-mechanism, and wrapping the bale with the wrapping material by supplying further wrapping material from the dispenser to the bale, and expelling the wrapped bale from the baling chamber.

12 Claims, 8 Drawing Sheets

(56) References Cited

U.S. PATENT DOCUMENTS

| | | | | |
|---|---|---|---|---|
| 6,758,028 B1 * | 7/2004 | Underhill | | A01F 15/071 53/118 |
| 8,516,779 B2 * | 8/2013 | Bennett et al. | | 53/116 |
| 2001/0047640 A1 * | 12/2001 | Schaefer | | A01F 15/071 53/399 |
| 2003/0024407 A1 * | 2/2003 | Ehrenpfort et al. | | 100/8 |
| 2009/0249746 A1 * | 10/2009 | Viaud | | 53/399 |
| 2010/0089013 A1 * | 4/2010 | McClure et al. | | 53/587 |
| 2010/0192516 A1 * | 8/2010 | Olander | | 53/399 |
| 2011/0179750 A1 * | 7/2011 | Smith | | 53/399 |

FOREIGN PATENT DOCUMENTS

| | | | |
|---|---|---|---|
| EP | 1 352 554 A1 | 10/2003 | |
| EP | 1 205 102 B1 | 1/2008 | |
| GB | 2 158 111 A | 11/1985 | |
| IE | WO 03039240 A1 * | 5/2003 | ............ A01F 15/071 |
| WO | 97/18699 A1 | 5/1997 | |
| WO | 00/36903 A1 | 6/2000 | |
| WO | 03/039240 A1 | 5/2003 | |
| WO | WO 03039240 A1 * | 5/2003 | |

* cited by examiner

COMBINED METHOD FOR COMPACTING MATERIAL INTO A BALE AND WRAPPING THE BALE AND A COMBINED BALER AND BALE WRAPPING APPARATUS

The present disclosure relates to a combined method for compacting material such as fodder, loose material or the like into a bale and wrapping the bale, and a combined baler and bale wrapping apparatus.

BACKGROUND

Balers for forming cylindrical bales are of a fixed chamber or a variable chamber type. Such devices are known as such in different configurations.

Document EP 1 077 025 B1 discloses a baler apparatus working as follows. The grass is picked-up by adequate means, formed and pressed into a bale in a baling chamber by rollers, belts or like engaging means. When baling is complete, second means apply a strip of netting around the cylindrical outer surface of the bale in the same chamber. Afterwards the rear portion of the baling chamber is raised and the bale is transferred to third means for applying stretch film which is located behind the baling chamber by conveyer means. During the transfer of the bale to the third means for applying the stretch film, the rear portion of the baling chamber is lowered and thereafter the compression of a new bale can start. At the same time, the wrapping of the bale arranged by the third means for applying the stretch film is started. After wrapping the bale, the bale is put down on the ground by according forth means. Afterwards the cycle starts again.

Document EP 1 205 102 B1 describes a baler apparatus which is capable in situ, of forming a cylindrical bale, applying a partial envelope of netting around the cylindrical surface of the bale, and applying stretch film wrapping to the bale in the same baling chamber. The cycles for baling and packaging with this apparatus are as follows. A cylindrical bale is formed by supplying material to be baled to the chamber. Rollers, belts or like engaging means assist the forming of the bale. Means for applying a strip of netting around the cylindrical outer surface form at least one layer of netting thereon. One part of the baler chamber is raised and at the same time as the rotation stops. A stretching film is applied by means which are fastened to a rotating ring that surrounds the round bale in the baling chamber. The round bale is then put down on the ground and the cycle can start again.

Balers as described above have a common disadvantage. With those balers it is necessary to tie the bales within netting material prior to wrapping as otherwise the bale will break apart upon ejection from the baling machine or by simply opening the baling chamber. Furthermore the need for tying the bales is costly, because means for applying netting material must be provided. More particularly, the provision of netting material on cylindrical bales means also a great disadvantage for the fanner because he has to cut off the netting material before feeding out the fodder. Another risk is that the cylindrical bale may unroll during the feeding out operation.

Document GB 2 158 111 describes the use of special machines for removing the netting material. The need for use of such machines is another disadvantage regarding cost efficiency.

Document EP 1 352 554 B1 discloses a combined compacting and wrapping machine. The machine is provided with a compacting and wrapping station, and a wrapping and tipping station. In operation, a bale is formed in the compacting and wrapping station in a baling chamber. Following, in the compacting and wrapping station the baling chamber is raised vertically along columns by means of hydraulic rams. The upward travel of the chamber exposes the bottom portion of the compacted bale which rests on a platform. A film dispenser is than rotated around the exposed cylindrical surface of the bale to wrap the bale with plastics firm from the dispenser and continues to operate until all the exposed surface of the bale is wrapped, including an overlap of the bottom and top corners of the bale. After such first wrapping the bale is provided to the wrapping and tipping station located on the rear side of the apparatus and separately from the compacting and wrapping station. Following, the bale is wrapped in the wrapping and tipping station, and finally the bale is expelled from the apparatus.

SUMMARY OF THE DISCLOSURE

It is an object of the present disclosure to provide a more efficient technology for combined processes of compacting material such as fodder, loose material or the like into a bale and wrapping the bale with a wrapping material.

According to the present disclosure, a combined method for compacting material such as fodder, loose material or the like into a bale and wrapping the bale with a wrapping material according to claim 1 is provided. Further, a combined baler and bale wrapping apparatus according to claim 11 is provided. Advantageous embodiments are provided in dependent claims.

According to an aspect, a combined method for compacting material such as fodder, loose material or the like into a bale and wrapping the bale with a wrapping material is provided, the method comprising:
  in a bale-forming mode, steps of supplying a material to be baled to a baling chamber of a combined baler and bale wrapping apparatus, and forming a bale of the material in the baling chamber,
  in a bale-securing mode, steps of opening a cover of the baling chamber, securing the bale by a securing-mechanism operatively assigned to the baling chamber in the baling chamber, applying a wrapping material supplied from a dispenser to the secured bale, thereby providing one or more securing layers of the wrapping material encircling the bale, and releasing the bale from securing by the securing-mechanism, and
  in a bale-wrapping mode, steps of in the baling chamber, wrapping the bale with the wrapping material by supplying further wrapping material from the dispenser to the bale, and expelling the wrapped bale from the baling chamber.

According to another aspect, a combined baler and bale wrapping apparatus is provided, comprising a baling chamber, and a securing-mechanism operatively assigned to the baling chamber, wherein the baling chamber and the securing-mechanism are configured to perform
  a bale-forming mode comprising a step of forming a bale from material supplied to the baling chamber,
  a bale-securing mode comprising steps of opening a cover of the baling chamber, securing the bale by a securing-mechanism in the baling chamber, and applying a wrapping material supplied from a dispenser to the secured bale, thereby providing one or more securing layers of the wrapping material encircling the bale, and releasing the bale from securing by the securing-mechanism, and
  a bale-wrapping mode comprising steps of wrapping the bale with the wrapping material by supplying further wrapping material from the dispenser, and expelling the wrapped bale from the baling chamber.

The different modes of operation, namely the bale-forming mode, the bale-securing mode and the bale-wrapping mode are performed while the bale being still in preparation or being finished is in the baling chamber. The material collected is compacted, secured and wrapped in one place, the baling chamber.

In the bale-securing mode the bale formed before may be firmly held by the securing mechanism. In general, by the securing mechanism the bale is secured from falling apart while the baling chamber is opened. In a preferred embodiment, the securing mechanism may be configured to essentially secure the compact form of the bale as it was generated in the bale-forming mode. The securing mechanism may be implemented with a securing unit or securing assembly.

The bale may be released from securing by the securing mechanism stepwise. In a preferred embodiment, an early step of the release process starts while the at least one securing layer is still generated.

The baling chamber may be implemented as a roller baling chamber. A roller- or a roller-belt/chain-device is operatively assigned to the baling chamber for compacting the material provided to the baling chamber into the bale. In a preferred embodiment, the device or elements of the device used to compact the material in the baling chamber may also be used for rotating the formed bale in the bale-wrapping mode in the baling chamber, preferably for rotating the bale while applying the wrapping material to the bale. Also, the roller- or a roller-belt/chain-device may, at least in part, be integrated with the securing mechanism, thereby forming a multi-functional mechanism usable in different modes of operation of the baling chamber. The securing mechanism, in a preferred embodiment, may be part of the roller- or a roller-belt/chain-device.

In one embodiment, in the bale-securing mode, the bale is secured by a roller-mechanism operatively assigned to the baling chamber. In this embodiment, the securing mechanism is provided with the roller-mechanism comprising a roller assembly driven by a roller driving unit. Optionally, the roller-mechanism comprises at least one belt and/or at least one chain carried by the roller assembly. Such mechanism may also be referred to as a roller-belt/chain-mechanism.

In another preferred embodiment, in the bale-securing mode, the bale is secured by tightening a belt carried by the roller-mechanism. In the bale-securing mode, the bale is secured by tightening at least one belt or at least one chain of a roller-belt/chain-mechanism. The at least one belt/chain may be a conveyor belt/chain used in the bale-forming mode for conveying the material baled. In such embodiment, by the roller-belt/chain-mechanism at least a multi-function mechanism is provided used for both the bale forming and the bale securing process. In such embodiment, the belt may be provided as a conveyor belt. However, in another embodiment the belt/chain may be provided exclusively for securing the bale formed in the bale-forming mode before. In general, the securing of the bale may also be referred to as form fixing of the bale.

In a preferred embodiment, in the bale-securing mode, the bale may be secured by tightening several belts or chains carried by the roller-mechanism. For example, a group of belts/chains may be used for securing the bale, the group of belts or chains being in part or in total provided by a plurality of belts/chains carried by the roller-mechanism operatively assigned to the baling chamber.

According to a further embodiment, in the bale-securing mode, the bale is secured by moving a securing element against the bale. The securing element being part of the securing mechanism is moved from a resting position into an operation position in which the securing element, optionally in combination with one or more other elements of the securing-mechanism, prevents the formed bale from falling apart. The securing element may be operated in the bale-forming mode as well. However, the securing element may exclusively be used in the bale-securing mode. The securing element may be provided with a roller element or a roller assembly. In a preferred embodiment, the securing element is moved against the bale from the bottom side of the baling chamber. In the operation position, the securing element may be provided in a location cleared before by moving away some element of the roller-belt-mechanism. In this or other embodiments, by performing the bale-securing mode the bale formed is secured essentially in the bale form established in the bale-forming mode.

In a preferred embodiment, wherein the roller-mechanism is used for forming the bale in the bale-forming mode, and, in the bale-securing mode, one or more rollers of the roller-mechanism are moved from a proximal position proximal to the bale to a distal position distal to the bale when the cover of the baling chamber is opened, while the belt assigned to the one or more rollers is kept in firm contact with the bale. The rollers lifted-up may be provided on the cover, thereby moving the one or more rollers together with the cover. In another embodiment, the rollers provide an upper group of rollers of the roller-belt-mechanism.

In still a further embodiment, in the bale-securing mode, for applying the wrapping material to the bale a relative movement between the bale and the dispenser is performed by moving the dispenser. The bale formed may be kept locally fixed while the dispenser is moved.

According to a preferred embodiment, the dispenser is moved around the bale for applying the wrapping material to the bale. The dispenser may be moved on a circle surrounding the bale. Alternatively or in addition, in some embodiment the bale together with one or all elements of the roller- or roller-belt/chain-mechanism may be moved while the wrapping material is applied to the bale in the bale-securing mode. In such case, the roller- or roller-belt/chain-mechanism may be provided on a rotatable base rotatable relatively to the dispenser.

In another preferred embodiment, in the bale-securing mode, the wrapping material is applied to the bale around an axis which is essentially perpendicular to an axis of rotation of the bale in the bale-forming mode. In this or other embodiments, the bale-securing can be done by wrapping plain sides of the bale having a cylindrical form.

According to still another embodiment, in the bale-securing mode and the bale-wrapping mode, a plastic stretch material is applied to the bale. In this or other embodiments, the same wrapping material may be used in both modes of operation, namely the bale-securing mode and the bale-wrapping mode. Also, wrapping materials having different parameters of flexibility and/or stretching characteristics may be used in the different modes.

With respect to preferred embodiments of the combined baler and bale wrapping apparatus, the inventive aspects described for the combined method of compacting material into a bale and wrapping the bale described above apply accordingly. In a preferred embodiment, the securing mechanism is provided with a roller- or roller-belt/chain-mechanism.

DESCRIPTION OF PREFERRED EMBODIMENTS

Following the invention will be described in further detail, by way of example, with reference to different embodiments. In the figures show.

Figure 1:
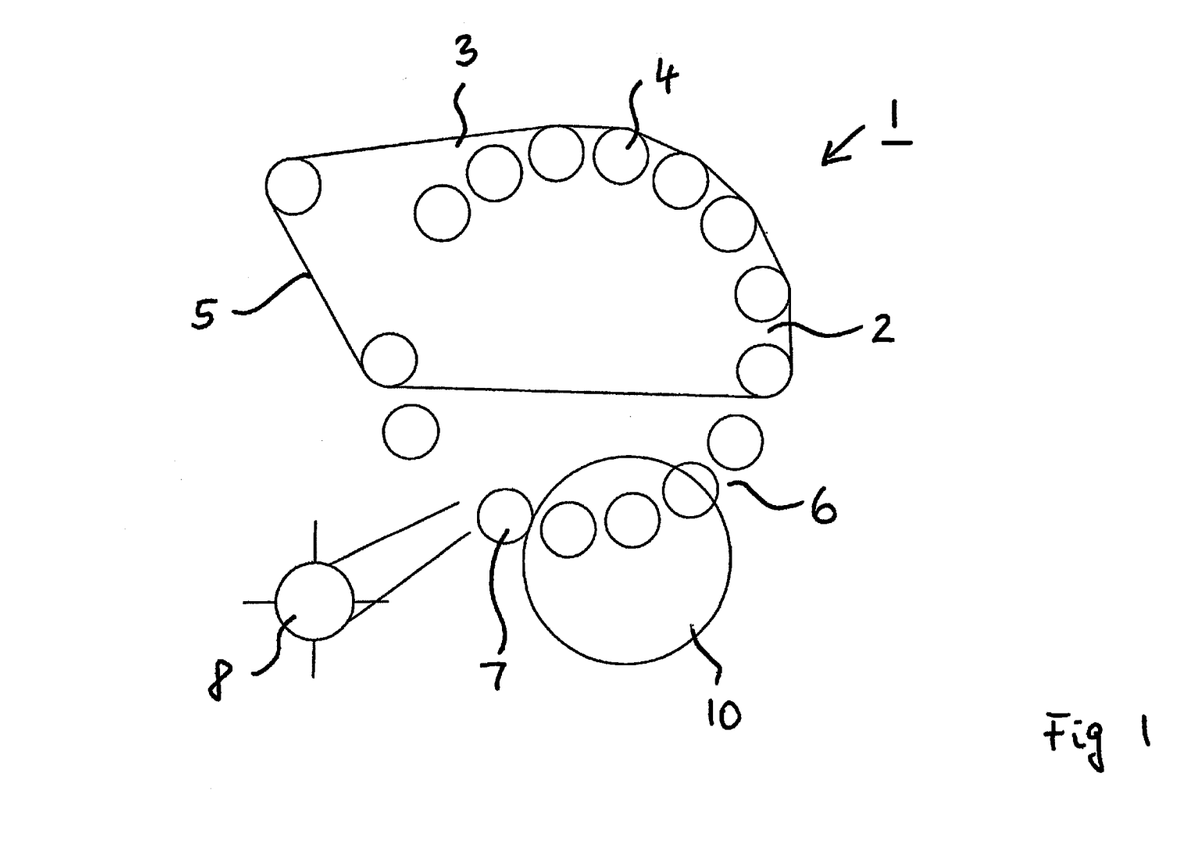
FIG. 1 a schematic representation of a baling chamber of a combined baler and bale wrapping apparatus with no material in the baling chamber, FIG. 2 a schematic representation of the baling chamber in FIG. 1 operating in a bale-forming mode, FIG. 3 a schematic representation of the baling chamber in FIG. 1 operating in the bale-forming mode, wherein bale forming is completed, and FIG. 4 a schematic representation of the baling chamber in FIG. 1 operating in a bale-securing mode, FIG. 5 a schematic representation of a combined baler and bale wrapping apparatus comprising a baling chamber in a bale-forming mode, FIG. 6 a schematic representation of the combined baler and bale wrapping apparatus in FIG. 5 operating in a bale-securing mode, FIG. 7 a schematic representation of the combined baler and bale wrapping apparatus in FIG. 5, wherein bale forming and securing is completed, and FIG. 8 a schematic representation of the combined baler and bale wrapping apparatus in FIG. 5, wherein the bale formed and wrapped is dropped.

FIG. 1 shows a schematic representation of a baling chamber 1 of a combined baler and bale wrapping apparatus with no material in the baling chamber 1. The baling chamber 1 is provided with a roller-belt-mechanism 2 comprising, on a top side 3 of the baling chamber 1, an upper group of rollers 4 carrying a conveyor belt 5 and, on the bottom side 6 of the baling chamber 1, a lower group of rollers 7. Also, the lower group of rollers 7 may be provided with a conveyor belt (not shown).

The upper group of rollers 4 and the lower group of rollers 7 can be driven separately or together depending on the mode of operation active.

In FIG. 1, a collecting mechanism 8 for collecting the material to be baled and for feeding it to the baling chamber 1 is schematically shown.

Figure 2:
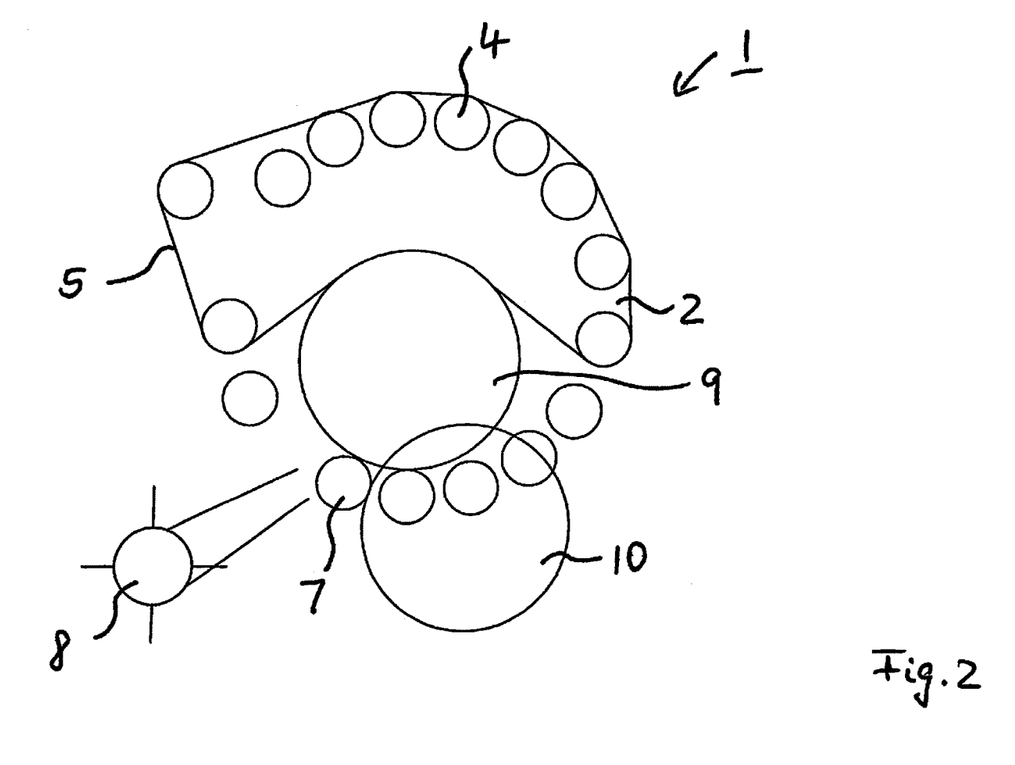

The roller-belt-mechanism 2 is provided inside the baling chamber 1 which, at least in part, is surrounded by a removable cover (not shown). Especially, a top part of the cover may be lifted-up to open the baling chamber 1. The cover of the baling chamber 1 covers a circumference of about 180 to 200 degrees of the outer surface of a cylindrical bale 9 formed (see FIG. 2). Referring to FIG. 2, the upper and lower group of rollers 4, 7 are positioned in a way that it follows the outer circumference of the bale 9 to be formed.

Also, in FIG. 1 a wheel 10 of the combined baler and bale wrapping apparatus provided with the baling chamber 1 is schematically depicted.

The conveyor belt 5 is made of a flexible material and can be tightened and untightened by means described below. At least one half of the conveyor belt 5 is guided by the upper group of rollers 4 at an outer circumference of the adjustment of the upper group of rollers 4 inside the baling chamber 1. The other half of the conveyor belt 5 does not follow the inner shape of the circumference of the roller adjustment but is kept in a stretched position.

One of the rollers of the upper group of rollers 4 mounted on the circumference adjustment at the top of the baling chamber 1 is fastened to a heavy spring or a hydraulic cylinder. This arrangement can tighten the roller and hence the conveyor belt 5 due to its flexible behaviour.

To start a bale-forming process the following steps are initiated. The baling chamber 1 is closed, especially by moving down the cover. Pressure is applied to the conveyor belt 5 by the heavy spring or the hydraulic cylinder and the material to be baled, especially grass, is fed into a small chamber provided by the roller-belt-mechanism 2 (see FIG. 2) in the baling chamber 1. The material is set in rotation by the movement of the conveyor belt 5 in the cover of the baling chamber 1, and optionally by the lower group of rollers 7 or a further belt carried by the lower group of rollers 7. This process is comparable to baling chamber operation known as such. Due to a high tension of the conveyor belt 5 there is thus a very hard core of pressed material in the cylindrical bale 9.

After about a quarter of the total amount of the material is fed into the baling chamber 1, the cylindrical bale 9 and the conveyor belt 5 are pushed upward against the underside of the upper group of rollers 4 inside the baling chamber 1. The process is assisted by lowering the pressure of the heavy spring or the hydraulic cylinder thereby un-tightening the conveyor belt 5.

Figure 3:
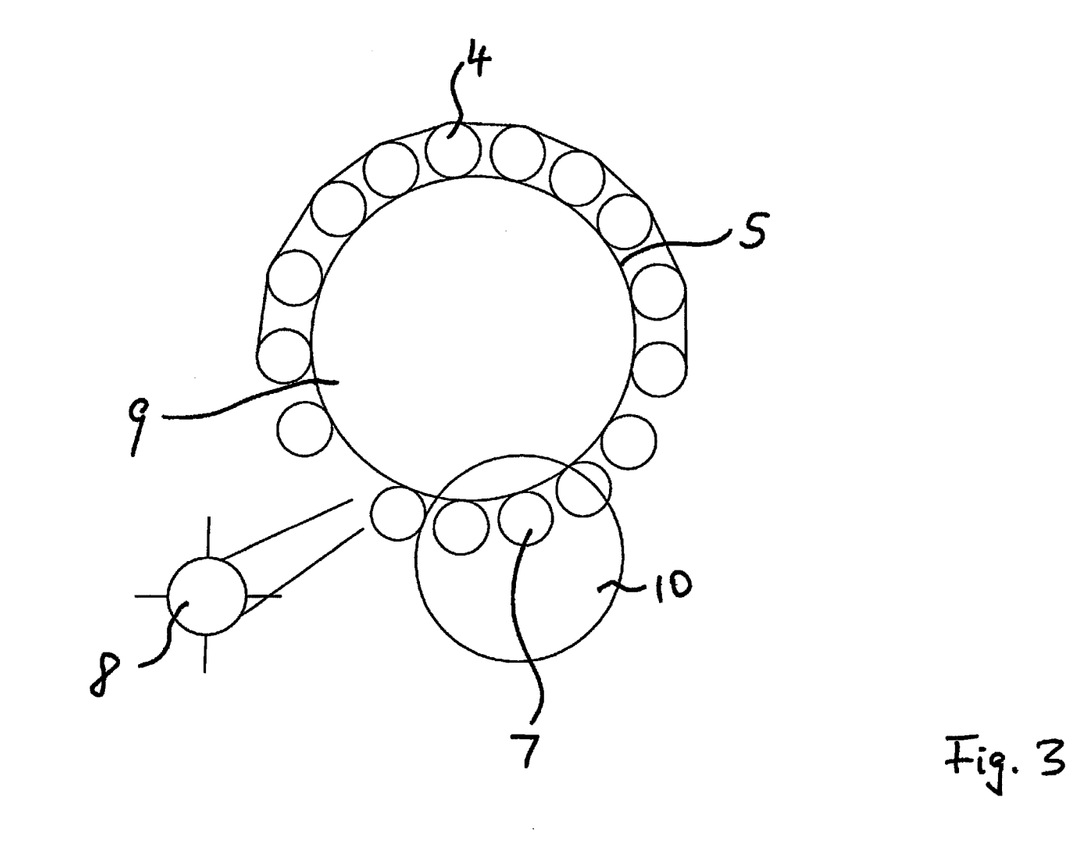

When the bale 9 is completely pressed, shown in FIG. 3, the following bale-securing process is started. The rotation of the bale 9 is stopped, and the cover of the baling chamber 1 is opened. With the movement of the cover in an open position, the conveyor belt 5 is tightened as strong as possible by the outside roller affected by the spring or the hydraulic cylinder. When the cover is completely open, the bale is secured by the conveyor belt 5 is tightened (see FIG. 4). The form of the bale 9 generated in the former bale-forming process is essentially kept. The cylindrical bale 9 is thus firmly held in the baling chamber by the tension of the conveyor belt 5. The pressure of the conveyor belt 5 prevents the cylindrical bale 9 from degrading so that an additional net becomes not necessary.

Figure 4:
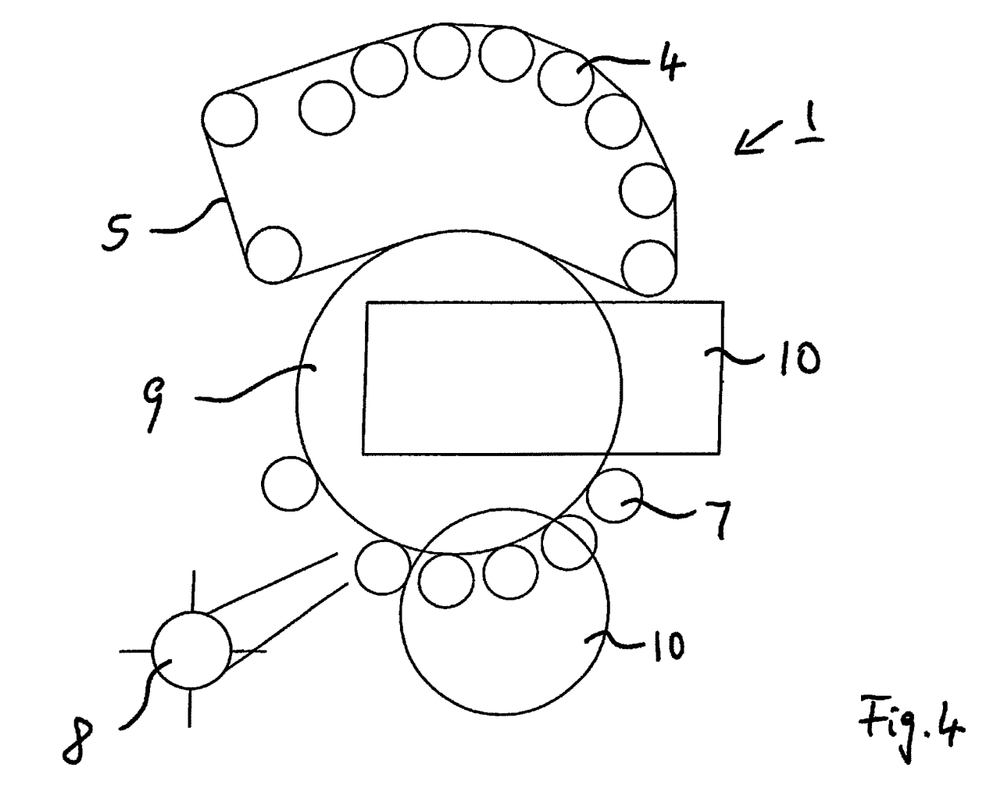
Figure 5:
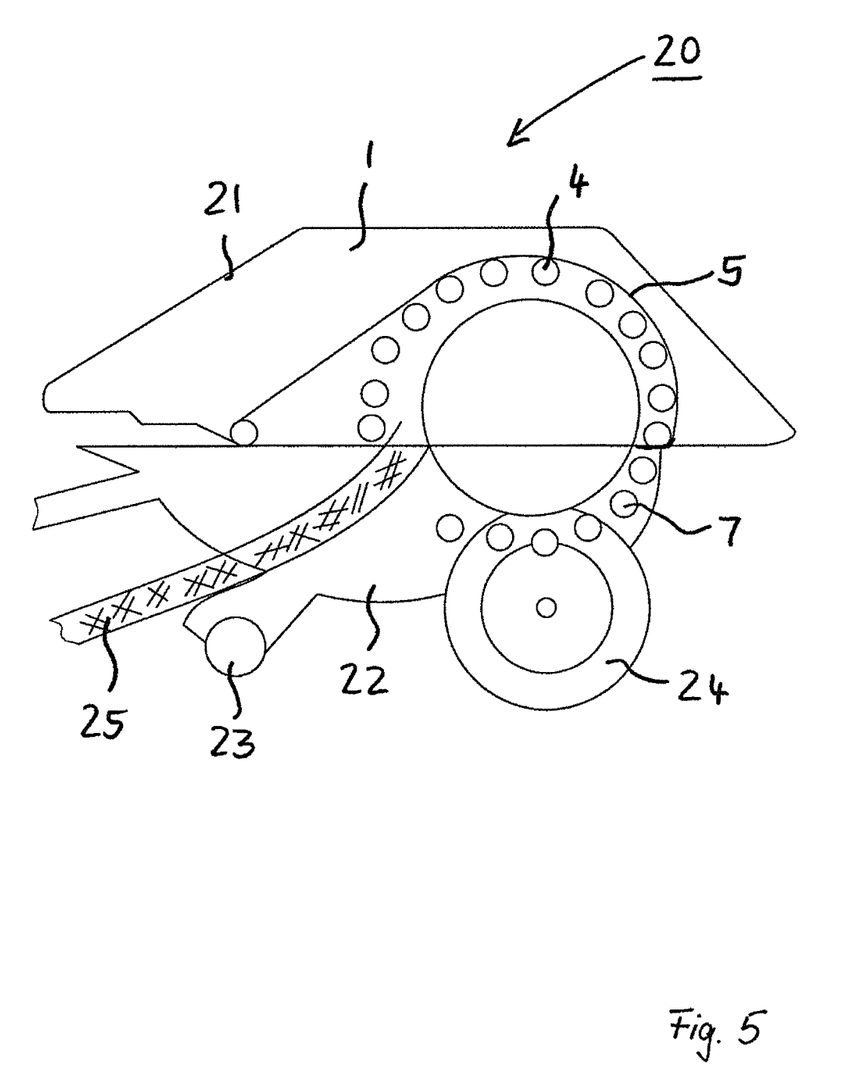
Figure 6:
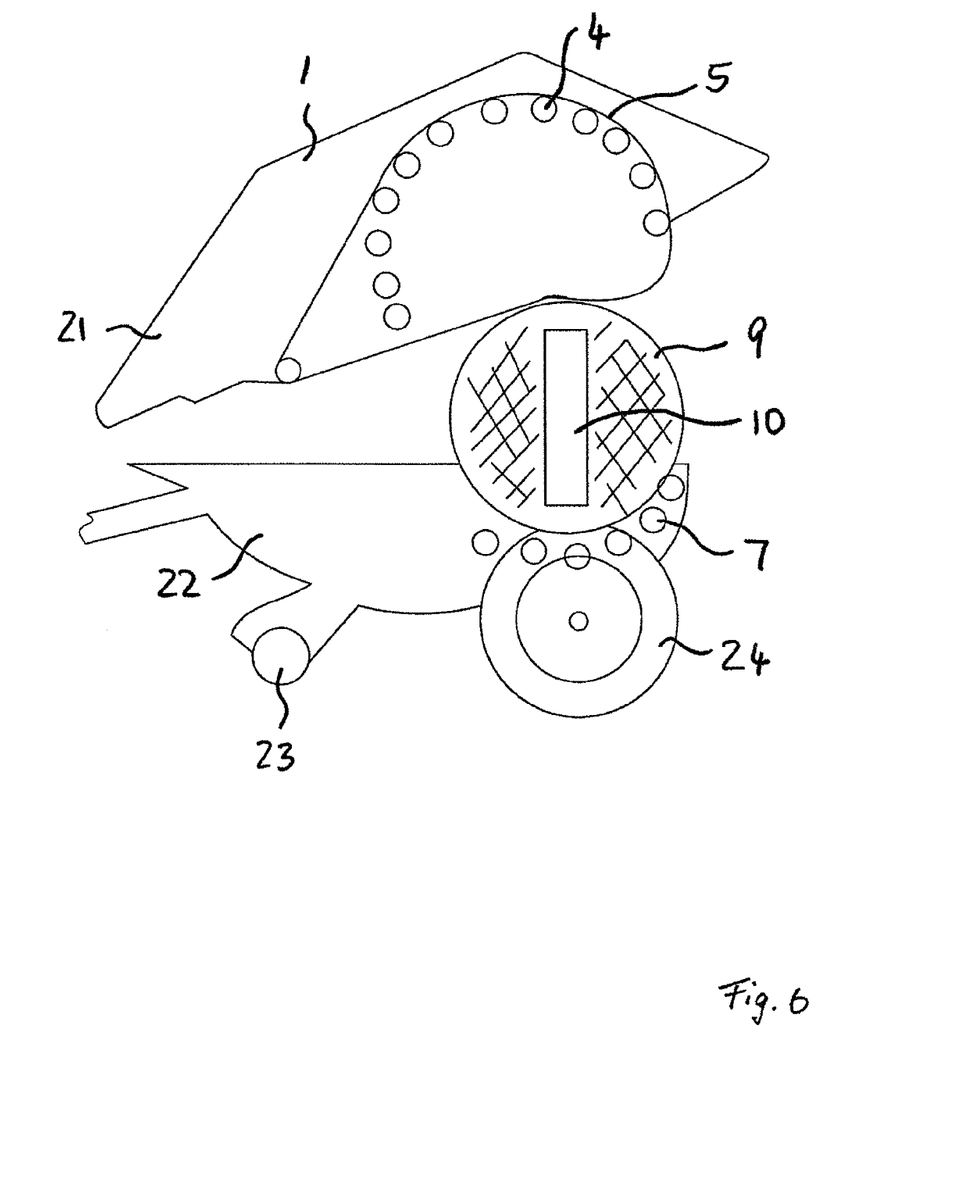
Figure 7:
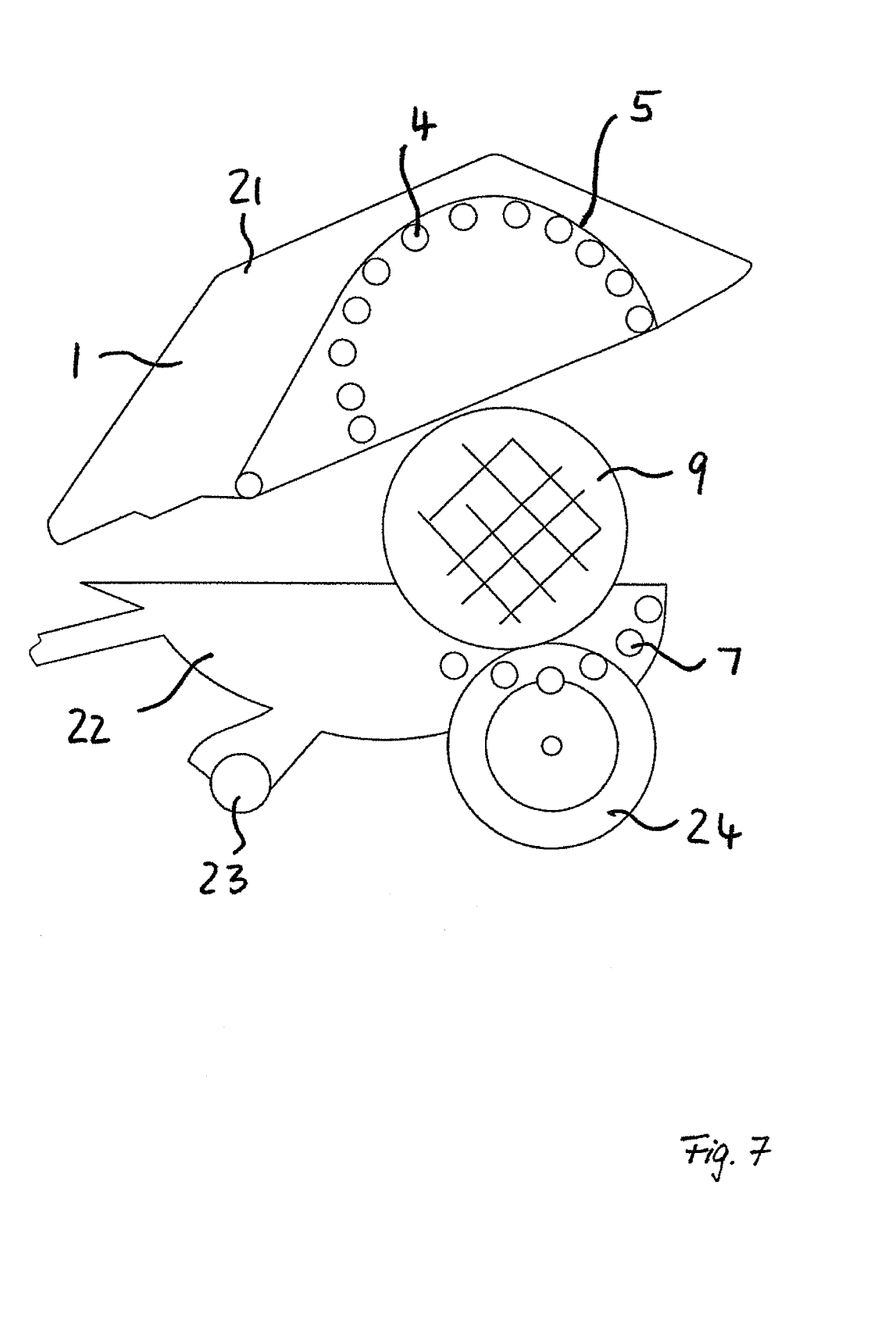
Figure 8:
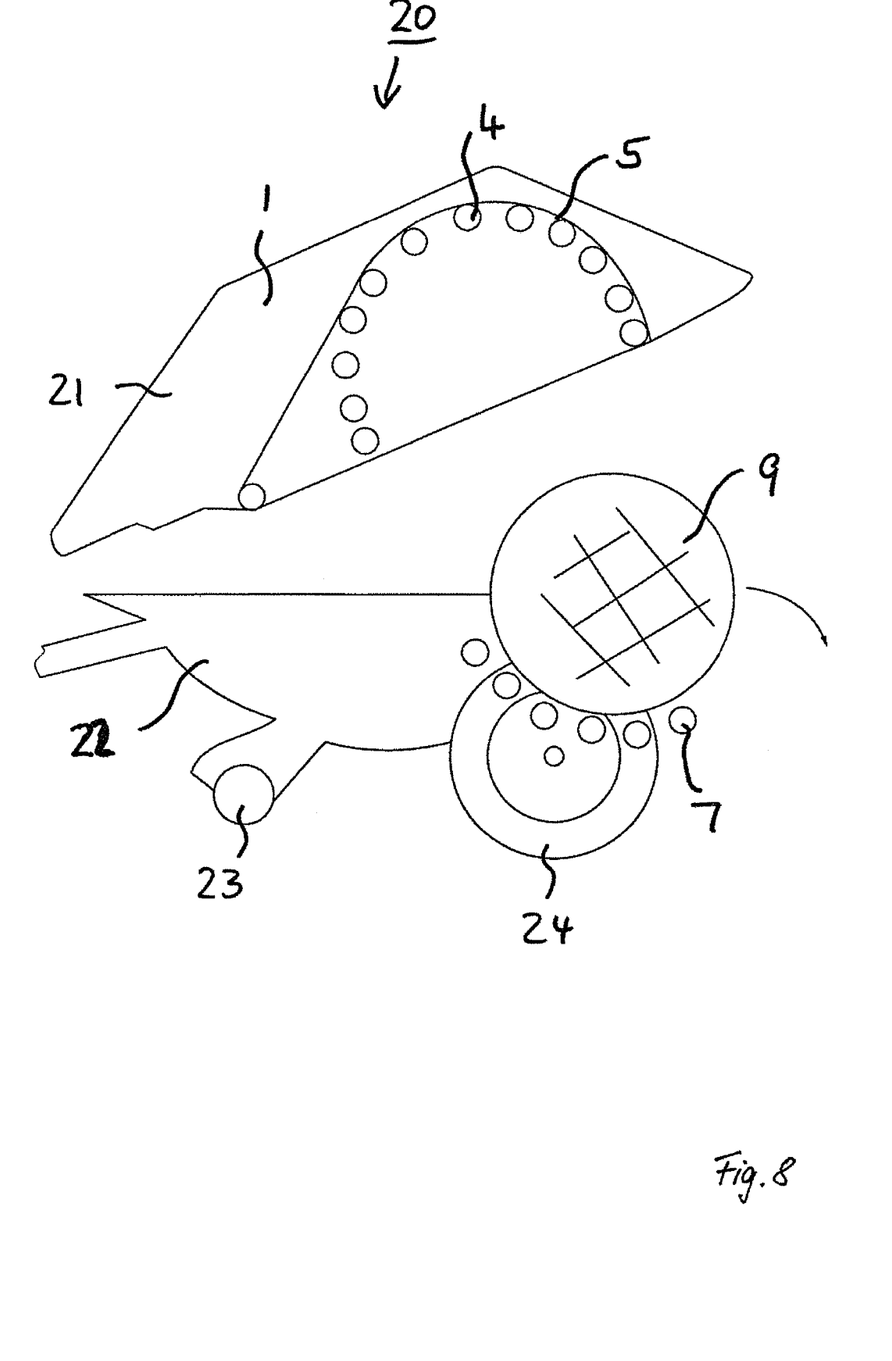

In addition, for optimized bale securing a securing roller (not shown) located at the opposite end of the upper group of rollers 4 may be pulled and moved into the direction of the base of the baling chamber 1 to keep a certain force against the formed bale 9.

Referring to FIG. 4, a dispenser 10 is provided on a holder for supplying one or more wrapping materials, preferably one or more stretching films. The holder is capable of carrying out a closed path of movement around the cylindrical bale 9, wherein this holder can have a form of a ring surrounding the plain sides of the cylindrical bale 9. The dispenser 10, for example, may turn around the bale 9 twice to put on two securing layers of plastic film. Following, the firmly hold bale 9 is released by un-tightening the conveyor belt 5 and/or moving back the securing roller in the opposite direction to the starting or resting position. The cylindrical bale 9 is now fixed or secured by the securing layers of the stretching film. Due to the tension of the stretching film the cylindrical bale 9 cannot break apart.

Following, a bale-wrapping process is started. The cylindrical bale 9 is set into rotation by the roller-belt-mechanism 2, and also the stretching film dispenser 10 starts to turn around the cylindrical bale 9 again to cover the rest of the surfaces of the cylindrical bale 9 with the stretching film.

FIGS. 5 to 8 show schematic representations of a combined baler and bale wrapping apparatus 20 comprising a baling chamber 1 described with reference to the FIGS. 1 to 4 above. In the embodiment schematically shown, the combined baler and bale wrapping apparatus 20 is provided as towed vehicle. A top cover 21 is pivotally connected to a base part 22 receiving the lower group of rollers 7. The base part 22 is provided with wheels 23, 24. According to FIG. 5, by the collecting mechanism 8 the material 25 to be baled to the cylindrical bale 9 is collected and conveyed to the baling chamber 1 provided underneath the top cover 21.

The features disclosed in at least one of the specification, the claims, and the figures may be material for the realization of the disclosure in its various embodiments, taken in isolation or in various combinations thereof.

The invention claimed is:

1. A combined method for compacting material into a bale and wrapping the bale with a wrapping material, the method comprising:
    a bale-forming mode, comprising steps of
        supplying a material to be baled to a baling chamber of a combined baler and bale wrapping apparatus, and
        forming a bale of the material in the baling chamber;
    a bale-securing mode, following the bale-forming mode, comprising steps of
        opening a cover of the baling chamber,
        securing the bale by a securing-mechanism in the opened baling chamber,
        applying for a first time, a wrapping material supplied from a dispenser to the secured bale, thereby providing one or more securing layers of the wrapping material encircling the bale, and
        releasing the bale from securing by the securing-mechanism; and
    a bale-wrapping mode, following the bale-securing mode, comprising steps of
        in the baling chamber, wrapping the bale with the wrapping material by supplying further wrapping material from the dispenser to the bale, and
        expelling the wrapped bale from the baling chamber.

2. The method according to claim 1, wherein, in the bale-securing mode, securing the bale by a roller mechanism of the baling chamber.

3. The method according to claim 2, wherein, in the bale-securing mode, securing the bale by tightening a belt carried by the roller-mechanism.

4. The method according to claim 3, wherein using the roller-mechanism for forming the bale in the bale-forming mode, and, in the bale-securing mode, moving one or more rollers of the roller-mechanism from a proximal position, proximal to the bale, to a distal position, distal to the bale, when the cover of the baling chamber is opened, while the belt assigned to the one or more rollers is kept in firm contact with the bale.

5. The method according to claim 2, wherein, in the bale-securing mode, securing the bale by tightening a group of belts carried by the roller-mechanism.

6. The method according to claim 5, wherein using the roller-mechanism for forming the bale in the bale-forming mode, and, in the bale-securing mode, moving one or more rollers of the roller-mechanism from a proximal position, proximal to the bale, to a distal position, distal to the bale, when the cover of the baling chamber is opened, while the at least one of the belts assigned to the one or more rollers is kept in firm contact with the bale.

7. The method according to claim 2, wherein using the roller-mechanism for forming the bale in the bale-forming mode, and, in the bale-securing mode, moving one or more rollers of the roller-mechanism from a proximal position, proximal to the bale, to a distal position, distal to the bale, when the cover of the baling chamber is opened, while the at least one belt assigned to the one or more rollers is kept in firm contact with the bale.

8. The method according to claim 1, wherein, in the bale-securing mode, securing the bale by moving a securing element against the bale.

9. The method according to claim 1, wherein, in the bale-securing mode, for applying the wrapping material to the bale, a relative movement between the bale and the dispenser is performed by moving the dispenser.

10. The method according to claim 9, wherein, moving the dispenser around the bale for applying the wrapping material to the bale.

11. The method according to claim 1, wherein, in the bale-securing mode, applying the wrapping material to the bale around an axis which is perpendicular to an axis of rotation of the bale in the bale-forming mode.

12. The method according to claim 1, wherein, in the bale-securing mode and the bale-wrapping mode, applying a plastic stretch material to the bale.

* * * * *